(12) United States Patent
Cawthorne et al.

(10) Patent No.: US 6,868,318 B1
(45) Date of Patent: Mar. 15, 2005

(54) METHOD FOR ADJUSTING BATTERY POWER LIMITS IN A HYBRID ELECTRIC VEHICLE TO PROVIDE CONSISTENT LAUNCH CHARACTERISTICS

(75) Inventors: William R. Cawthorne, Milford, MI (US); Gregory A. Hubbard, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/686,174

(22) Filed: Oct. 14, 2003

(51) Int. Cl.[7] ............... H02J 7/00; B60K 31/02
(52) U.S. Cl. .............. 701/22; 320/134; 318/139; 307/10.1
(58) Field of Search ............ 307/64, 10.8, 10.1; 320/162, 128, 126, 125, 136, 119, 108, 104, 150; 180/65.8, 65.2, 65.3; 280/1; 290/16, 27; 318/139, 432, 368, 143; 370/127; 701/22, 102, 110, 114

(56) References Cited

U.S. PATENT DOCUMENTS

| | | | |
|---|---|---|---|
| 5,910,722 A | 6/1999 | Lyons et al. | |
| 5,931,757 A | 8/1999 | Schmidt | |
| 6,163,135 A | * 12/2000 | Nakayama et al. | 320/150 |
| 6,215,198 B1 | 4/2001 | Inada et al. | |
| 6,449,537 B1 | 9/2002 | Phillips et al. | |
| 6,668,963 B2 | * 12/2003 | Nada | 180/279 |
| 6,674,265 B2 | * 1/2004 | Yoshida et al. | 320/125 |
| 6,728,619 B2 | * 4/2004 | Adachi et al. | 701/50 |
| 6,745,117 B1 | * 6/2004 | Thacher et al. | 701/50 |
| 2003/0155810 A1 | * 8/2003 | Mizuta et al. | 307/10.1 |
| 2003/0158638 A1 | * 8/2003 | Yakes et al. | 701/22 |
| 2003/0169001 A1 | * 9/2003 | Murakami et al. | 318/139 |
| 2003/0207156 A1 | * 11/2003 | Ovshinsky et al. | 429/9 |
| 2003/0209022 A1 | * 11/2003 | Ieda et al. | 62/244 |
| 2003/0218447 A1 | * 11/2003 | Coates et al. | 320/134 |

* cited by examiner

Primary Examiner—Thomas G. Black
Assistant Examiner—Tuan C To
(74) Attorney, Agent, or Firm—Leslie C. Hodges

(57) ABSTRACT

A method is disclosed for improving the performance of an energy storage system that incorporates a high density electrical energy storage device, such a battery or ultracapacitor. The method may be implemented in an energy storage system of a hybrid electric vehicle (HEV) as a computer control algorithm for controlling the discharge power limits of an energy storage device, such as a battery. The method allows the discharge power limits of the battery to be temporarily expanded under vehicle launch conditions where the power demands are high, thereby making additional stored energy available for use under such conditions by improving battery utilization and providing more consistent vehicle launch characteristics than would otherwise be available.

18 Claims, 6 Drawing Sheets

METHOD FOR ADJUSTING BATTERY POWER LIMITS IN A HYBRID ELECTRIC VEHICLE TO PROVIDE CONSISTENT LAUNCH CHARACTERISTICS

TECHNICAL FIELD

This invention comprises a method for controlling the energy storage system (ESS) in a hybrid electric vehicle (HEV). More particularly, the method comprises a computer control algorithm for determining the discharge limits for the battery in an HEV, such that it is protected from damage and yet is capable of maximum available utilization. Most specifically, the method comprises a computer control algorithm for expanding the discharge power limits of the battery of an HEV under launch conditions while also maintaining the overall integrity of the discharge power protection limits.

BACKGROUND OF THE INVENTION

An HEV is a vehicle that has a propulsion system that consists of at least one electric motor or electric machine in combination with at least one other power source. Typically, the other power source is a gasoline or diesel engine. There are various types of HEVs depending on how the electric motor(s) and other power source(s) are combined with one another in order to provide propulsion for the vehicle, including series, parallel and compound HEVs.

Various hybrid powertrain architectures are known for managing the input and output torques of various propulsion systems in HEVs, most commonly internal combustion engines and electric machines. Series hybrid architectures are generally characterized by an internal combustion engine driving an electric generator which in turn provides electrical power to an electric drivetrain and to an energy storage system, comprising a battery pack. The internal combustion engine in a series HEV is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack.

Parallel HEV architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel HEV powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions (i.e. input split, output split and compound split configurations) thereby enabling high-torque continuously variable speed ratios, electrically dominated launches, regenerative braking, engine off idling, and two-mode operation.

As noted, such complex EVT HEVs utilize one or more electric machines and require advanced energy transmission, conversion and storage systems to supply electrical energy to and receive and store electrical energy from these machines, and would typically comprise, for example, at least one electric machine, power inverter module, power bus, energy storage device, such as a battery, as well as various control electronics, control algorithms and other associated items. The energy storage system (ESS) may comprise any suitable energy storage system that is adapted for high-density energy storage, including a battery, ultracapacitor, or other high-density energy storage device. As used herein, reference to a battery includes not only a single battery, also includes any combination of single or multiple batteries, or cells thereof, into a battery pack or array, or a plurality of battery packs or arrays. This invention is particularly suitable for use in a parallel array of battery packs, each of which comprised a plurality of batteries. As used herein, the term battery generally refers to any secondary or rechargeable battery, but those comprising lead/acid, nickel/metal hydride (Ni/MH, or Li/ion or polymer cells are preferred.

Given the dynamics associated with operation of an HEV, particularly the constant flow of energy into and out of the energy storage device, the battery plays a critical role in the operation of these vehicles. The critical role of the battery in these vehicles imposes a number of requirements on the battery performance, including both operational and service life requirements.

Significant attention has been given to maintaining the operational performance of batteries used in HEV applications. Particular attention has been given to various aspects of maintaining the battery pack state of charge (SOC). The SOC is defined generally as the ratio of the residual charge in a battery relative to its full charge capacity. Various hardware and software control strategies have been adjusted for determining and maintaining the SOC of the battery.

While understanding and maintaining the SOC of the battery is critical to its performance in HEV applications, it is not the only important characteristic of the battery. Another critical characteristic of batteries used in HEV applications is the useful life of the battery or battery pack. For example, it is known that secondary batteries, such as Ni-MH batteries, have limited amp-hour throughput that defines their useful service life. The anp-hour throughput or capacity of the battery is the integral of the energy flowing through the battery as a function of time as it is constantly charged and discharged in service.

While it is critical to manage various aspects of the ESS of an HEV as described above, it is also necessary to ensure certain aspects of vehicle performance, such as the vehicle launch characteristics. Vehicle launches are generally associated with starting the motion of the vehicle from a stop, and may be characterized by the speed of the vehicle and its required torque output at any given point during operation of vehicle (i.e., no or low speed and relatively high torque). However, launch conditions may also exist during other periods of vehicle operation, such as acceleration from a low-speed interval, or seeking to maintain or increase speed while negotiating an incline. Therefore, it is desirable to develop control algorithms for vehicle operation which ensure the management and protection of the ESS, particularly the battery, while at the same time ensuring that the ESS, including the battery, may be fully utilized to ensure optimum vehicle performance under launch conditions.

SUMMARY OF THE INVENTION

The invention may be described generally as a method of implementing a wide limit mode (WLM) of operation in a vehicle comprising an energy storage system having a rechargeable battery, the battery having a plurality of monitored battery parameters, a discharge power limit and a closed-loop controller, the controller having a timer and a counter that are adapted to count time intervals associated with the implementation of the WLM by incrementing a count when the WLM is active and decrementing the count or maintaining a zero count when the WLM is not active, comprising the steps of: (1) determining whether the WLM is active; (2) setting a WLM discharge power limit when the WLM is active that is greater than the discharge power limit; and (3) establishing a duty cycle for the WLM using the timer and counter, wherein the duty cycle comprises a maximum time interval during which the increased discharge power associated with the WLM is available for use by the vehicle and a minimum time interval during which the increased discharge power associated with the WLM is not available for use by the vehicle.

The method is preferably implemented as a computer control algorithm in a closed loop controller that is adapted to control the battery discharge power limits. The method is used to temporarily extend the battery power limits to less restrictive values during vehicle launch maneuvers and thereby allow the HEV to provide consistent launch performance using the batteries in a number of operational situations that would otherwise result in limited battery availability and reduced vehicle performance while also maintaining the maximum battery discharge power limits and the protections that they afford the battery.

The invention overcomes the deficiencies of the prior art by providing a means for expanding the battery discharge power limits during launch maneuvers such that consistent vehicle launch performance is maintained or improved.

BRIEF DESCRIPTION OF THE DRAWINGS

The present invention will become more fully understood from the detailed description given here below, the appended claims, and the accompanying drawings in which:

DESCRIPTION OF THE PREFERRED EMBODIMENT

This invention provides a method for adjusting battery discharge power limits. More specifically, it may be used as a control algorithm for implementing a wide limit mode (WLM) of operation in an HEV, of the type described in commonly assigned, co-pending U.S. patent application Ser. Nos. 10/686,034 filed Oct. 14, 2003 and 10/686,508 filed Oct. 14, 2003 which awe herein incorporated by reference in their entirety, a compound split EVT HEV is disclosed which has characteristics of both a series and parallel HEV which generally comprise at least one drive motor, such as an internal combustion engine, at least one electric machine that is adapted to both provide propulsion to the vehicle and generate electric power for storage on the vehicle, and an ESS which typically comprises a rechargeable or secondary battery, as described herein. The WLM may be used to provide consistent vehicle launch characteristics. Vehicle launch conditions are defined broadly as conditions under which it is desirable to charge the battery to provide vehicle propulsion, generally where the vehicle output speed is low and the desired output torque is high, such as acceleration from a stop, acceleration up an incline, and other operating conditions where it is desirable to discharge the ESS for vehicle propulsion. Launch conditions may be defined by a range of vehicle speeds and a range of desired vehicle output torques, or output torques, associated with those vehicle speeds. Due to the dynamic charge/discharge conditions experienced by the ESS in an HEV, and the desire to monitor and control various battery parameters associated with these conditions, it is frequently the case that the discharge power of an ESS is limited by control actions taken due to ESS parameters. In the case of an ESS comprising a rechargeable battery, these may include battery parameters such as the state of charge (SOC), temperature and energy throughput. A method of determining parametric battery power limits for an ESS of an HEV which takes into account the battery SOC, temperature and amp-hour throughput is described in commonly assigned, copending U.S. provisional patent application Ser. No. 60/511,456 filed Oct. 15, 2003 and U.S. patent application Ser. No. 10/686,180 filed Oct. 14, 2003, which are both herein incorporated by reference in their entirety. Consequently, when the maximum battery discharge power is limited or reduced in conjunction with such control actions, the vehicle launch performance is as a result reduced as compared to situations where the batteries are capable of fill utilization and provision of the maximum battery diverge power. This invention provides a method for temporarily widening the battery discharge power limits such that more battery power can be utilized for short times during vehicle launch to provide consistent vehicle performance without damaging the battery.

Figure 2:
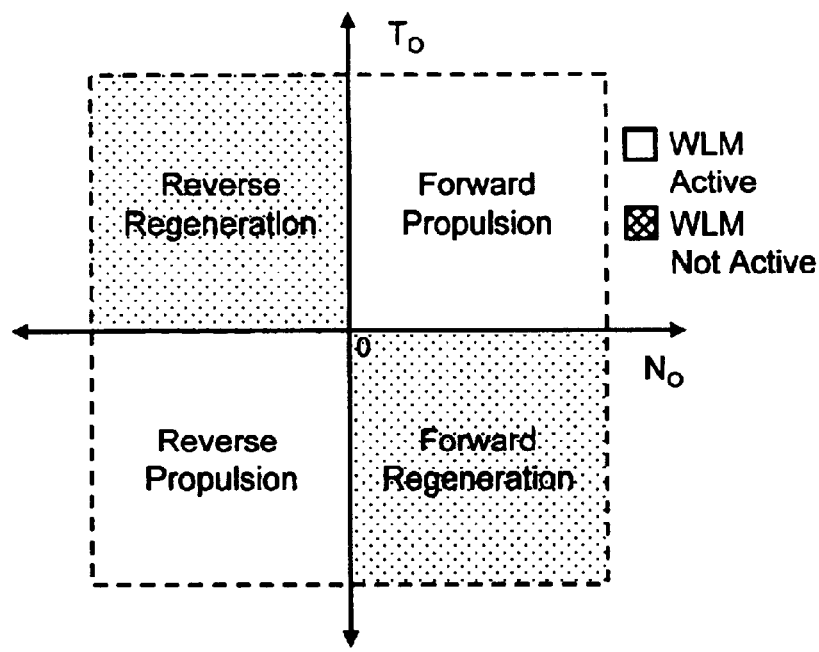
FIG. 2 illustrates the propulsion modes for the various combinations of input speed (No) and input torque command (To), including those for which the WLM is active.

The invention utilizes the output speed of the vehicle and the commanded output torque at that speed to determine the status of the vehicle and whether a launch condition exists and whether the WLM is active or not active. The algorithm determines the vehicle is in a launch condition based on a comparison of the output speed of the vehicle and the commanded output torque. According to the method of the invention, the WLM is activated for certain combinations when the output speed is low and the commanded output torque is high, and also takes into account not only the magnitude of these values, but their direction, as illustrated in FIG. 2. The WLM is not activated for other combinations of vehicle speed. When these conditions are met, the algorithm determines that the system is in a launch condition and the WLM allows for expanded battery discharge power limits in order to provide the desired vehicle performance under launch conditions.

The method of the invention may be implemented in any suitable closed-loop controller within the vehicle. It is preferably implemented within the controller associated with the performance of the ESS, but may be implemented in any suitable closed loop controller within the vehicle that is in signal communication with the ESS.

Figure 1:
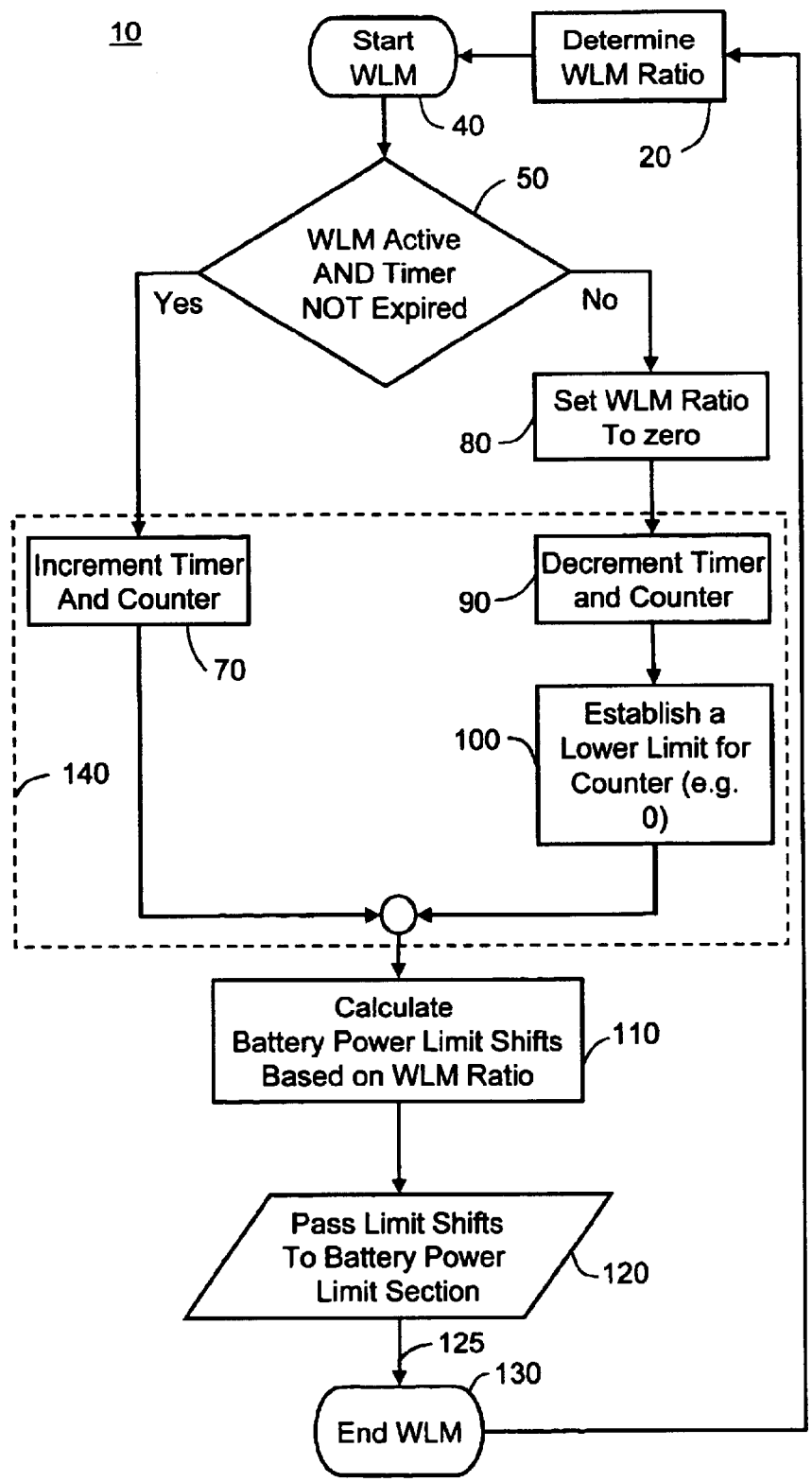
FIG. 1 is a functional block diagram generally illustrating of the steps of the method of the present invention.

The method 10 of the invention is illustrated generally in FIG. 1, and may be described as a control algorithm 10 for implementing a wide limit mode (WLM) of operation in a vehicle comprising an energy storage system having a rechargeable battery, the battery having at least one monitored battery power parameter, at least one parametric discharge power limit and a closed-loop controller operating through the execution of a plurality of control loops and adapted to determine whether the WLM is active or not active, the controller having a timer and a counter that are adapted to count time intervals associated with the implementation of the WLM by incrementing a count when the WLM is active and decrementing the count or maintaining a zero count when the WLM is not active; comprising the steps of: (1) determining a WLM ratio 20 using a vehicle speed input and a vehicle torque command input; (2) initializing the timer, counter and a control loop 40, wherein the WLM ratio is set to zero for the first control loop (3) determining whether the WLM is active and whether the timer is expired 50, and if the WLM is active and the timer is not expired, proceeding to step (4), otherwise, proceeding to step (5); (4) incrementing the timer and counter 70 and proceeding to step (8); (5) setting the WLM ratio to zero 80; (6) decrementing the timer and counter 90 and proceeding to step (7); (7) setting a lower limit for the counter 100 and proceeding to step (8); (8) determining the amount of a WLM discharge power limit shift that is based on the WLM ratio; (9) applying the WLM discharge power limit shift to at least one of the parametric discharge power limits; and (10) determining whether the control loop is the last control loop, wherein if the control loop is the final control loop, and if yes, ending the algorithm, and if no, iterating the algorithm for another control loop by returning to step (1). These steps are described further below. The determination of control loop status and whether the WLM is to be active or not may be divided among a plurality of system controllers.

Figure 3:
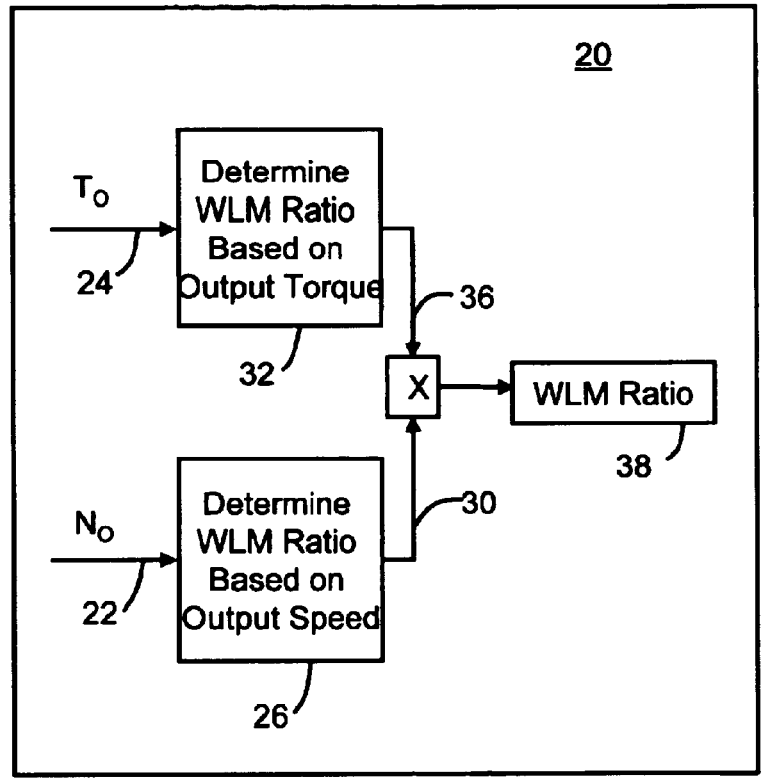
FIG. 3 is a functional block diagram generally illustrating the steps of block 20 of FIG. 1.
Figure 4:
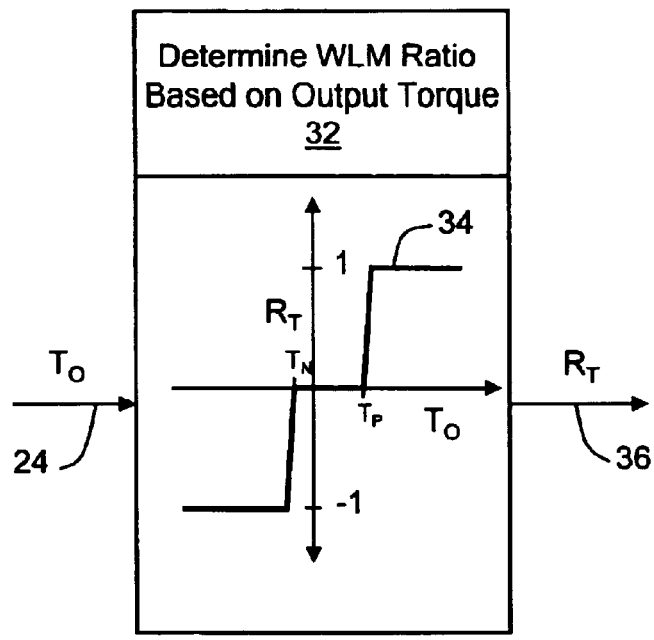
FIG. 4 is a functional block diagram generally illustrating the steps of block 32 of FIG. 3.
Figure 5:
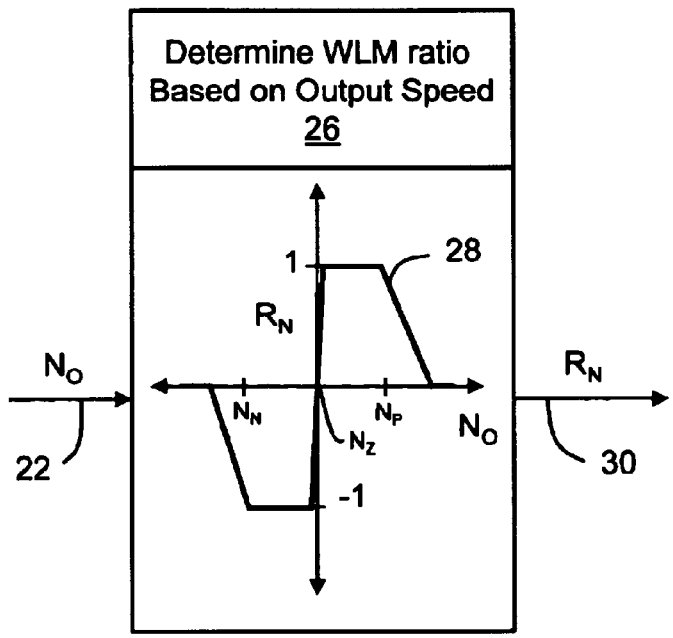
FIG. 5 is a functional block diagram generally illustrating the steps of block 26 of FIG. 3.

Referring to FIGS. 3–5, the step of determining a WLM ratio 20 using a vehicle output speed input and a vehicle output torque command input is described in greater detail. The WLM ratio is a simplified means of simultaneously characterizing both the magnitude and direction of both a vehicle speed input and a vehicle torque command input over a range of values of these quantities, so that decisions can be made about activation and deactivation of the WLM as a function of these vehicle parameters. The vehicle output speed input is the actual vehicle speed and may be obtained by any of a number of known methods, such as utilizing the output of a speedometer, tachometer or other rotational motion or rate sensing means associated with the vehicle drivetrain. The output speed input is typically represented as either a positive or negative value depending on the direction of vehicle motion (i.e. forward or reverse motion), with the magnitude of the input indicating the magnitude of the speed. Means for obtaining a vehicle speed input are well-known. The vehicle output torque command input is a calculated value that may be obtained from any vehicle controller that is adapted to control the vehicle powertrain performance, including the torque output of the vehicle powertrain.

As shown in FIG. 3, the step of determining WLM ratio 20 using vehicle output speed 22 input and vehicle output torque command 24 input may be performed by the further steps of (1a) determining a WLM output speed ratio ($R_N$) 26 that characterizes the WLM as a function of the vehicle output speed 22 input; (1b) determining a WLM output torque ratio ($R_T$) 32 that characterizes the WLM as a function of vehicle output torque command 24 input; and (1c) multiplying $R_N$ 26 and $R_T$ 32 to obtain WLM ratio ($R_{WLM}$) 38; wherein WLM ratio 38 has a value which determines whether the WLM is active.

The value of $R_T$ 34 is determined using lookup table 32 with the desired torque output ($T_O$) 24 of the vehicle as an input and $R_T$ 36 as the output, as shown in FIG. 4. The axes of the lookup table are established as calibratable values in the controller such that the values can be tuned to produce the desired vehicle response under launch conditions. It is believed that the preferred characteristic response of $R_T$ 34 as a function of the vehicle output torque command 24 is illustrated in FIG. 4. In the implementation shown in FIG. 4, negative values of $T_O$ correspond to output command torques 24 associated with either forward regeneration or reverse propulsion, depending on the direction of vehicle motion, as illustrated in FIG. 2. Likewise, positive values of $T_O$ correspond to output command torques 24 associated with either forward propulsion or reverse regeneration, depending on the direction of vehicle motion, as illustrated in FIG. 2. As shown in FIG. 4, moving away from the origin in the direction of negative torque, $R_T$ 34 begins at zero and remains there until a negative torque transition threshold ($T_N$) is reached, whereupon $R_T$ 34 transitions at a rapid rate to a value of −1, and thereafter remains at −1. Therefore, $R_T$ comprises a value in the range −1<$R_T$<1. As also shown in FIG. 4, moving away from the origin in the direction of positive torque, $R_T$ 34 also begins at zero and remains there until a positive torque transition threshold ($T_P$) is reached, whereupon $R_T$ 34 transitions at a rapid rate to a value of 1, and thereafter remains at 1. The values of $T_N$ and $T_P$ may be selected to tune the WLM with regard to the vehicle output torque commands that define a launch condition, and may also be varied from one vehicle type to another so as to differentiate the definition of a launch condition, and hence, vehicle launch performance by vehicle type. For a relatively large vehicle, such as a bus, $T_N$ was selected to be about −200 N-m, and $T_P$ was selected to be about 300 N-m. The values of these transitions and the shape of this curve may be symmetric or asymmetric, depending on the desired launch response as a function of output torque command. The object of the selection of the values of $R_T$ and the characteristics shape of the function described is to allow WLM to be active only when the vehicle is operating at higher torque levels. WLM is intended to extend the battery limits only when the vehicle is in a launch condition. A launch maneuver that would require extended battery power for consistent driver feel would typically be a high output torque maneuver at relatively low vehicle speeds, such as a rapid acceleration from a stop or low vehicle speed. Thus, the function of the output torque command based component of the WLM ratio is primarily binary in nature and is used to signify whether the output torque command is representative of a high torque launch where activation of the WLM would be required.

Similarly, the value of $R_N$ 28 is determined using lookup table 26 with $N_O$ 22 of the vehicle as an input and $R_N$ 28 as the output, as shown in FIG. 5. The axes of the lookup table are established as calibratable values in the controller such that the values can be tuned to produce the desired vehicle response under launch conditions. It is believed that the preferred characteristic response of $R_N$ 28 as a function of the vehicle output speed 22 is illustrated in FIG. 5. In the implementation shown in FIG. 5, negative values of $N_O$ correspond to output speeds 22 associated with either reverse propulsion or reverse regeneration, depending on the direction of the output torque command, as illustrated in FIG. 2. Likewise, positive values of $N_O$ correspond to output speeds 22 associated with either forward propulsion or forward regeneration, depending on the direction of output torque command, as illustrated in FIG. 2. As shown in FIG.

5, moving away from the origin in the direction of negative speed, $R_N$ 28 begins at zero which is a transition point and decreases at a relatively rapid rate to a value of −1 land remains there until a negative speed transition threshold ($N_N$) is reached, whereupon $R_N$ 28 again transitions to a value of 0, and thereafter remains at 0. As also shown in FIG. 5, moving away from the origin in the direction of positive speed, $R_N$ 28 begins at zero which is a transition point and increases at a relatively rapid rate to a value of 1 and remains there until a positive speed transition threshold ($N_P$) is reached, whereupon $R_N$ 28 again transitions to a value of 0, and thereafter remains at 0. Therefore, $R_N$ comprises a value in the range $-1 < R_N < 1$. The values of $N_N$ and $N_P$ and the rates of transition surrounding them may be selected to tune the WLM with regard to the vehicle output speeds that define a launch condition, and may also be varied from one vehicle type to another so as to differentiate the definition of a launch condition, and hence, vehicle launch performance by vehicle type. For a relatively large vehicle, such as a bus, $N_N$ was selected to be about −8 Kph with the transition complete to a value of 0 at a speed of about −11 Kph, and $N_P$ was selected to be about 8 Kph with the transition complete to a value of 0 at a speed of about 11 Kph. The values of these transitions and the shape of this curve may be symmetric or asymmetric, depending on the desired launch response as a function of output speed. The object of the selection of the values of $R_N$ and the characteristics shape of the function described is also to allow WLM to be active only when the vehicle is operating at relatively low vehicle speeds, and to ramp out smoothly as speed increases. A launch maneuver that would require extended battery power for consistent driver feel would typically be a low speed, high output torque maneuver, such as a rapid acceleration from a low speed. Thus, the function of the output speed based component of the WLM ratio is also primarily binary in nature and is used to signify whether the output speed is representative of a low speed launch where activation of the WLM would be required.

Referring again to FIG. 1, step (2) of control algorithm 10 comprises initializing the timer, counter and a control loop 40, wherein the WLM ratio is set to zero for the first control loop. The WLM timer and counter are preferably incorporated into the closed-loop controller that is used to implement the WLM. The WLM timer is implemented using a counter which incorporates hysteresis on the counter triggering.

Referring again to FIG. 1, step (3) of control algorithm 10 comprises determining whether the WLM is active and whether the timer is expired 50, and if the WLM is active and the timer is not expired, proceeding to step (4), otherwise, proceeding to step (5). The WLM is active in a given control loop if the composite WLM ratio as calculated in the previous control loop and described below is greater than zero. If the WLM ratio is zero, either one or both of the output torque based ratio and/or the output speed based ratio was such that the system should not be in WLM. During the first loop, the WLM ratio is initialized to zero. Referring to FIG. 2, the lookup tables for $R_N$ and $R_T$ have positive values for positive speed and torque and negative values for negative speed and torque, thereby permitting $R_{WLM}$ to be positive and WLM to be active and operate when the vehicle is in the reverse speed range, but not operate when the vehicle is in regeneration mode (positive output torque command). In forward propulsion mode, the output torque and speed would both be positive, as would $R_N$ and $R_T$, so the composite WLM ratio would also be positive. In forward regeneration, $R_N$ would be positive, but $R_T$ would be negative, so $R_{WLM}$ would be negative and WLM would not be active. Logic is included to limit $R_{WLM}$ to positive values, so any negative composite ratios would be set to zero, thereby inactivating the WLM. If the WLM is active and the timer is not expired, control algorithm 10 proceeds to step (4), otherwise, control algorithm 10 proceeds to step (5).

Step (4) of control algorithm is comprises the step of incrementing the timer and counter 70 and proceeding to step (8). Alternately, steps (5)–(8) of control algorithm comprise step (5) of setting the WLM ratio to zero 80; step (6) of decrementing the timer and counter 90 and step (7) of setting a lower limit for the counter 100 and proceeding to step (8). The lower limit for counter is preferably set at zero, so the count cannot be decremented below zero.

Figure 6:
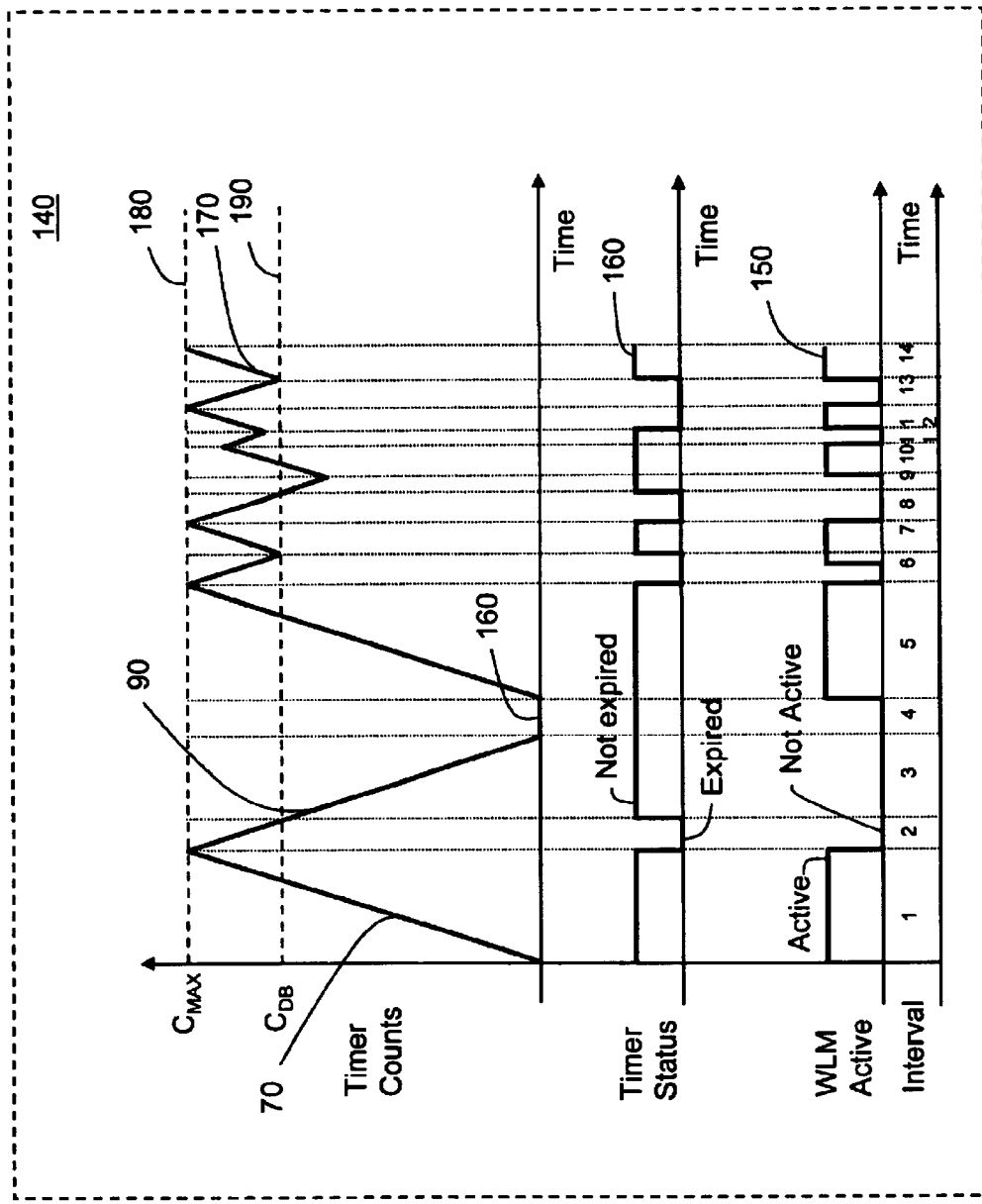
FIG. 6 is a graph illustrating a comparison of the WLM status, timer status and timer count for exemplary values of the WLM status as a function of time.

The interaction and implementation of the activation/inactivation of the WLM, expiration/activation of the timer, incrementing/decrementing and constraints associated with the counter are implemented in control logic found in the controller. During the time intervals where WLM is active, the counter continues to increment. Utilizing the hysteresis allows the WLM timer to be active until the number of timer counts reaches the count value $C_{MAX}$. Once the count reaches $C_{MAX}$, then the timer is expired and no longer increments the count and the WLM is inactivated. WLM may also be inactivated by virtue of the WLM ratio changing so that it is no longer greater than 0 and less than 1 (i.e. changes in the vehicle output torque command or output speed). When the timer has expired, or WLM is no longer active (whether due to the fact that the timer has expired or that the WLM ratio has changed), the counter begins to decrement. The timer remains expired and therefore WLM remain inactive, until the counter value drops below the count value $C_{DB}$. At which point, the timer is active again allowing the counter to begin to increment if the WLM is activated, or to continue to decrement to zero if the WLM is not activated. The maximum value of the WLM timer counter is limited by the operation of the timer as the counter is only incremented if the timer has not expired and an expired timer is defined as the counter value being greater than or equal to the limit value $C_{MAX}$. The minimum value of the counter, however, is not limited in the same fashion. To keep the counter from continuing to be decremented below zero, logic is included to limit the counter to positive values and zero. This method limits the amount of time the system can remain in WLM and provides additional protection to the ESS by not allowing the discharge limits to be expanded for extended periods of time. Referring to FIG. 6, the operation and interaction of timer, counter and WLM are illustrated and can be understood by reference to the operation of WLM control algorithm 10 for a plurality of control loops corresponding to time intervals 1–14. Interval 1 comprises a plurality of discreet time intervals associated with a plurality of control loops as the WLM is activated, the timer begins to count, and the counter is incremented 70 during each of the subsequent control loops. The timer is expired and WLM is inactivated when the counter reaches a preselected maximum count value ($C_{MAX}$). Interval 1 illustrates the maximum on time of the WLM, which may vary from application to application depending on the vehicle requirements, battery characteristics and other factors, but will generally be in a range off 10–15 seconds. The maximum on time should preferably be selected so as to ensure that the parametric battery discharge limits are not exceeded, or if exceeded due to overriding vehicle performance constraints, that the duration during which a parametric discharge limit is exceeded is minimized. Referring to interval 2, once the timer is expired, the counter is decremented 90 during subsequent control loops until the count is reduced to a value that is less than or equal to a deadband value of the count ($C_{DB}$), whereupon the timer is no longer expired and the count may be incremented again once the WLM is activated again. The deadband value of the count incorporates a hysteresis into the count and the combination of $C_{MAX}$ and $C_{DB}$, together with the control logic work together to define a duty cycle, such that the WLM cannot be active indefinitely, and that the WLM is limited with regard to activation/inactivation so that battery discharge limits established by the ESS or other controllers are not exceeded sufficiently by shifting various parametric limits to cause damage to the ESS. Referring again to FIG. 6, the timer continues to decrement during interval 3 because WLM is not active due to the WLM ratio during this interval. When counter reaches zero, the WLM is still not active, the decrement is limited so that the count is not less than zero 100, but the timer is not expired. Referring to interval 4, the WLM remains inactive and the count is still limited at zero, however, the timer is not expired. In interval 5, the WLM is activated and the timer is not expired, such that the count is incremented 70 until it reaches $C_{MAX}$, whereupon the timer is expired and consequently, WLM is inactivated. Referring to interval 6, the timer is expired, WLM is inactive and the counter is decremented even though the WLM becomes activated because the count has not reached $C_{DB}$. Referring to interval 7, WLM is active, and because the count has reached $C_{DB}$ timer is once again active and not expired, and count is once again incremented until reaching $C_{MAX}$. Referring to interval 8, upon reaching $C_{MAX}$, timer is expired and count is decremented until the count reached $C_{DB}$. Referring to interval 9, upon reaching $C_{DB}$, timer is active or not expired, but the count continues to decrement because the WLM is not active. Referring to interval 10, the WLM is activated and the timer is not expired, thus the count is incremented. Referring to interval 11, timer is not expired, however, the WLM is inactivated and thus the count is decremented. Referring to interval 12, the timer is still not expired and the WLM is active, therefore, the count is incremented. In interval 13, upon reaching $C_{MAX}$, WLM is inactivated, the timer is expired, and the count is decremented. Referring to interval 14, the WLM is activated, however, the timer is expired and the count is decremented until the count reached $C_{DB}$, whereupon the timer is not expired and the count is again incremented.

Figure 7:
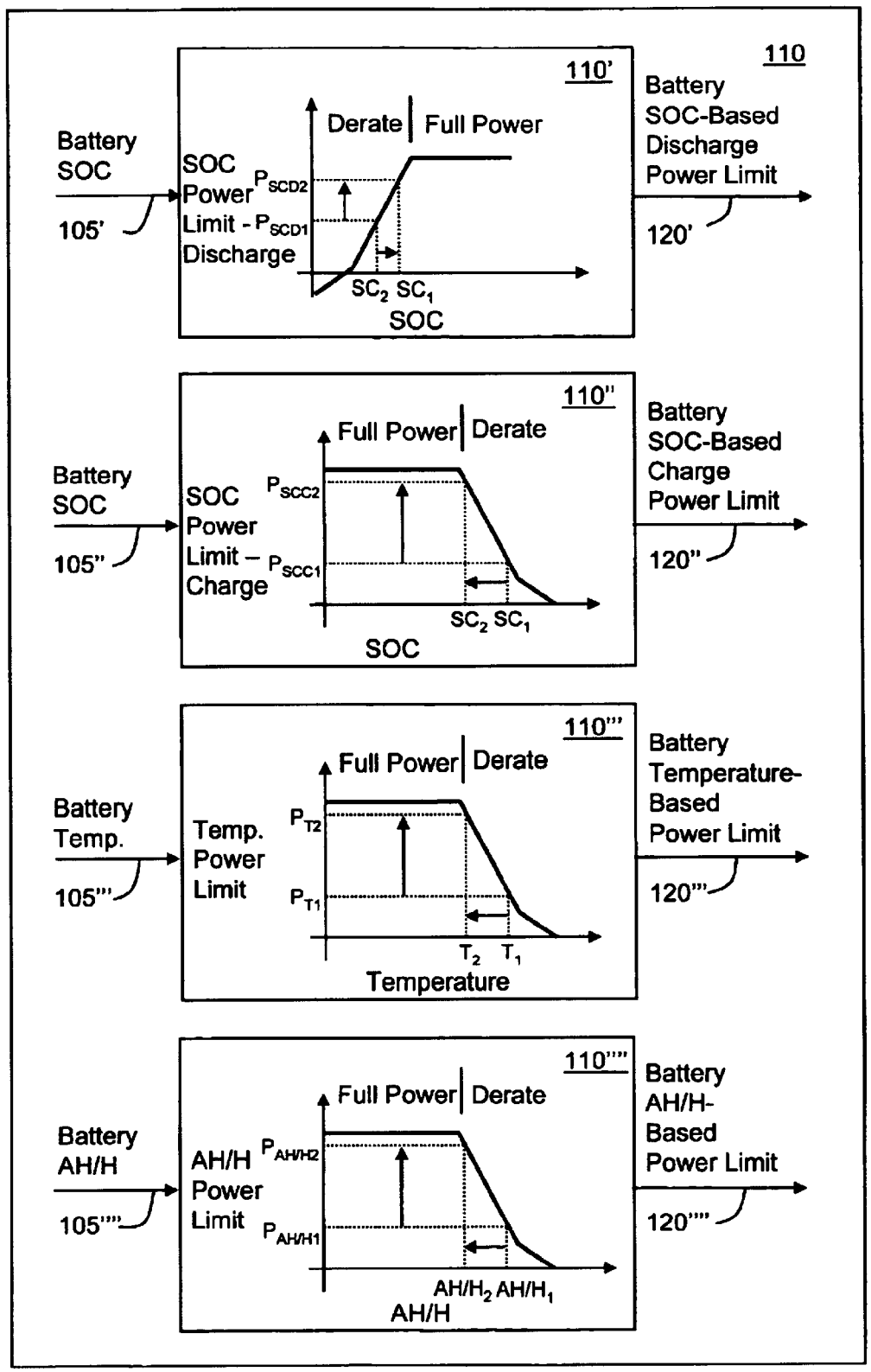
FIG. 7 is a schematic representation of a plurality of discharge power related limits, illustrating a WLM shift associated with each.

Referring to FIGS. 1 and 7, the method 10 also comprises step (8) of determining the amount of a WLM discharge power limit shift that is based on the WLM ratio. The WLM is used to expand battery discharge power limits that are used to protect the battery from damage due to excessive discharge. The battery discharge power limits are parametric limits in that they are limits that are imposed based on various battery parameters that may be monitored in order to ensure that the amount of energy discharged from the battery at any given time interval (hence the term battery power limits) does not damage the battery, including causing disproportionate reductions in the battery service life. These could include any discharge power limit associated with a parameter that may be monitored so as to provide such protection to the battery, but preferably include limits associated with the state of charge (SOC) with regard to both the charging and discharging of the battery, amp hour throughput and temperature. These limits may be determined either empirically or theoretically for a given parameter and in the case of computer control algorithm 10 are preferably incorporated into lookup tables. In this way, a calculated or measured value of the particular limit parameter may be used in conjunction with a corresponding lookup table to establish the particular battery power limit as a function of the parametric value. Therefore, the method of the invention requires that the parameters associated with the ESS, or battery, be monitored and available as inputs for determination of the parametric power limits. For example, if the battery temperature during a vehicle launch is above a temperature where the maximum discharge power limit would normally be reduced or derated, the battery discharge power limit would normally be reduced based on this temperature. Applicants have observed that this temperature does not rise significantly and the battery is not damaged if this derated limit value is exceeded for short periods of time, such as during the launching of the vehicle. However, by allowing this battery discharge power limit to be temporarily exceeded, the vehicle performance can be greatly enhanced. Rather than simply allow a complete violation of the battery discharge power limits though, this method provides a means to shift or expand the limits in a controlled manner and still provide the necessary discharge power protections to the battery system.

The shifting of the parametric value is accomplished by shifting the value of the parameter used as an input to the lookup table. For example, in the case of a discharge power limit based on battery temperature, the limit is derived from a lookup table as shown in FIG. 7. The actual temperature is shifted to a lower temperature, resulting in a shifted temperature based power discharge limit such that a higher battery discharge power will be allowed for the same actual battery temperature. In this example, a batter power shift, $T_{SHIFT}$, is subtracted from the actual battery temperature to get the wide limit mode temperature:

$$T_{WLM} = T_{ACTUAL} - T_{SHIFT} \quad [1]$$

The WLM temperature, $T_{WLM}$, is then used as the input to the lookup tables to determine the temperature based battery power limit. If the actual temperature were used, the battery power limit would be, $P_{T_{ACTUAL}}$, and when the WLM temperature is used the battery power limit would be $P_{T_{WLM}}$, which must be greater than, $P_{T_{ACTUAL}}$, due to the downward sloping nature of the battery discharge power limit lookup table curve.

Similar shifts are applied to the state of charge (SOC), both with respect to charging and discharging, and amp-hour/hour throughput values such that the battery power limits based on each of these parameters is expanded to a larger value when the WLM mode is active. The amount of the parameter shift is preferably a fixed amount, but may be selected so as to vary in magnitude as a function of the magnitude of the parametric value with which it is associated. In one embodiment, the temperature shift was about 5° F., the SOC (charging) limit shift was about 10%, the SOC (discharging) limit shift was about 10%, and the amp-hour/hour shift was about 5 amp-hours/hour.

Figure 8:
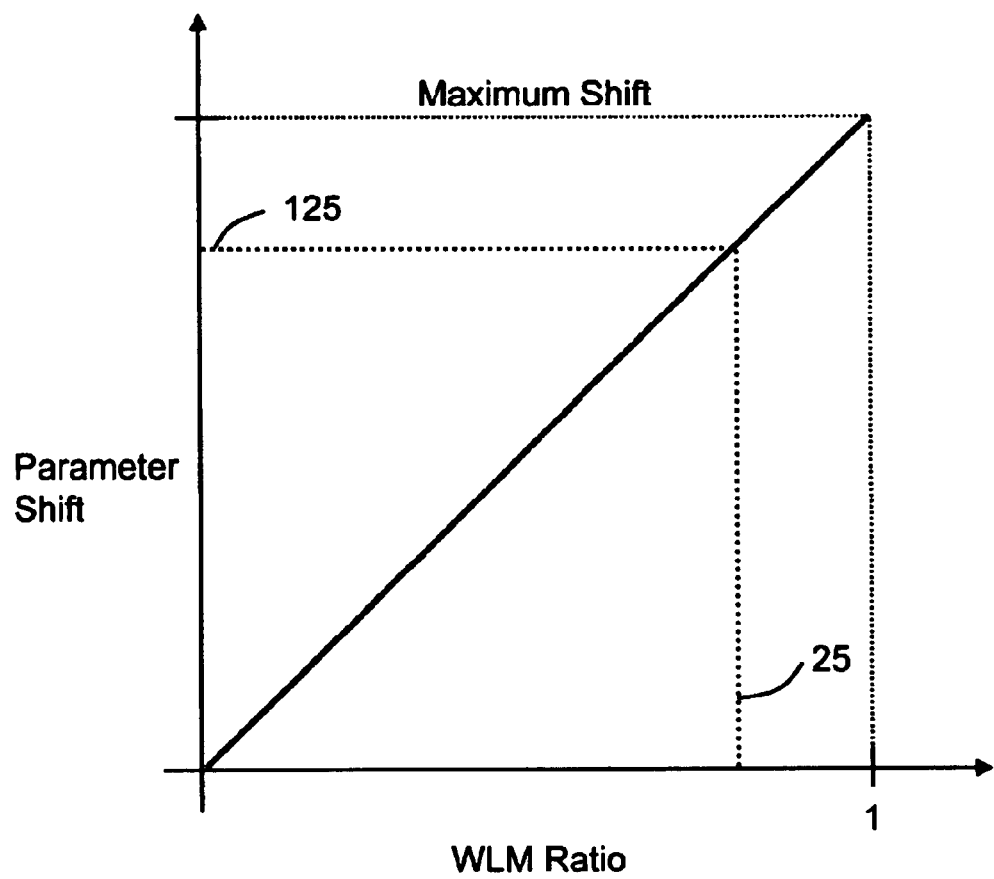
FIG. 8 is a graph illustrating the WLM shift as a function of the WLM ratio.

The magnitude of each of the parameter shifts are also adjusted as a function of the WLM ratio, so that the amount of the shift is a function of the commanded output torque and speed. These adjustments are determined by multiplying the parameter shift by the WLM ratio such that when the WLM ratio is 1, full shifting will occur, and when the WLM ratio is 0, no shifting will occur, as shown in FIG. 8. Once the shifted parametric discharge limits are determined, the limiting or minimum shifted (WLM) parametric discharge power limit is selected and output to the controller for use during that control loop as the WLM discharge power limit.

For example, if the battery temperature during a vehicle launch is above a temperature where the maximum discharge power limit would normally be derated, the battery power limit will be reduced based on this temperature. The battery temperature can not rise significantly if this limit value is exceeded for short periods of time, such as during the launching of the vehicle. However, by allowing this limit to be exceeded, the vehicle performance can be greatly enhanced. Rather than simply allow violation of limits, this method provides a means to expand the limits in a control manner and still provide the necessary protection to the battery system.

Based on the foregoing, the invention may also be described generally as a method of implementing a wide limit mode (WLM) of operation in a vehicle comprising an energy storage system having a rechargeable battery, the battery having a plurality of monitored battery parameters, a discharge power limit and a closed-loop controller, the controller having a timer and a counter that are adapted to count time intervals associated with the implementation of the WLM by incrementing a count when the WLM is active and decrementing the count or maintaining a zero count when the WLM is not active, comprising the steps of: (1) determining whether the WLM is active; (2) setting a WLM discharge power limit when the WLM is active that is greater than the discharge power limit; and (3) establishing a duty cycle for the WLM using the timer and counter, wherein the duty cycle comprises a maximum time interval during which the increased discharge power associated with the WLM is available for use by the vehicle and a minimum time interval during which the increased discharge power associated with the WLM is not available for use by the vehicle.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of implementing a wide limit mode (WLM) of operation in a vehicle comprising an energy storage system having a rechargeable battery, the battery having a plurality of monitored battery parameters, a discharge power limit and a closed-loop controller, the controller having a timer and a counter that are adapted to count time intervals associated with the implementation of the WLM by incrementing a count when the WLM is active and decrementing the count or maintaining a zero count when the WLM is not active, comprising the steps of:

(1) determining whether the WLM is active;

(2) setting a WLM discharge power limit when the WLM is active that is greater than the discharge power limit; and (3) establishing a duty cycle for the WLM using the timer and counter, wherein the duty cycle comprises a maximum time interval during which the WLM discharge power is available for use by the vehicle and a minimum time interval during which the WLM discharge power is not available for use by the vehicle.

2. The method of claim 1, wherein determining whether WLM is active in step (1) is performed using a vehicle speed input and a vehicle torque command input.

3. The method of claim 2, comprising the further steps of:

(1a) determining a WLM output speed ratio ($R_N$) that characterizes the WLM as a function of the vehicle output speed input;

(1b) determining a WLM output torque ratio ($R_T$) that characterizes the WLM as a function of the vehicle output torque command input;

(1c) multiplying $R_N$ and $R_T$ to obtain a WLM ratio; wherein the WLM ratio ($R_{WLM}$) has a value which determines whether the WLM is active or not.

4. The method of claim 3, wherein $R_N$ comprises a value in the range $-1<R_N<1$, $R_T$ comprises a value in the range $-1<R_T<1$, and wherein WLM is active for values of $R_{WLM}$, where $0<R_{WLM}<1$, and WLM is not active for all other values of $R_{WLM}$.

5. The method of claim 4, wherein the value of $R_N$ as a function of vehicle speed and the value of $R_T$ as a function of the torque command input are determined from a look-up table.

6. The method of claim 1, wherein setting the WLM discharge power limit of step (2) comprises shifting the discharge power limit by an amount that is determined by imputing a change in at least one parametric battery discharge power limit as a function of at least one battery parameter.

7. The method of claim 6, comprising the further steps of:

(2a) shifting the monitored value of at least one of the monitored battery power parameters ($B_1$) to a lower value ($B_2$); and (2b) shifting the parametric battery power discharge limit ($P_1$) associated with $B_1$ to an increased value associated with a shifted parametric battery power discharge limit ($P_2$) in accordance with a parametric relationship between the at least one parameter and the parametric battery power discharge limit.

8. The method of claim 7, wherein the amount by which the at least one parametric discharge power limit is increased and the value of the WLM discharge power limit are directly proportional to the value of $R_{WLM}$.

9. The method of claim 8, wherein the plurality of battery power parameters are selected from the group consisting of a battery temperature, battery state of charge and battery amp-hour throughput.

10. The method of claim 1, wherein step (3) comprises the further steps of:

(3a) incrementing the value of the count (C) by an increment associated with a control loop;

(3b) determining the value of C and whether WLM is active, wherein if C is less than a WLM maximum count limit ($C_M$) and WLM is active, returning to step (1), and wherein if C is equal to $C_M$ or WLM is not active, proceeding to step (3c);

(3c) setting the discharge power limit;

(3d) decrementing the value of C by a decrement associated with a control loop;

(3e) determining the value of C and whether WLM is active; wherein if the count is greater than a WLM dead band limit ($C_{DB}$) and WLM is active or not active, returning to step (3c); and wherein if the count is less than or equal to $C_{DB}$ and greater than zero and WLM is not active, returning to step (3c); and wherein if the count is less than or equal to $C_{DB}$ and greater than or equal to zero and WLM is active, returning to step (1); and wherein if the count is equal to zero and WLM is inactive, proceeding to step (3f);

(3f) holding the count at zero until WLM is active, and then returning to step (1).

11. A control algorithm for implementing a wide limit mode (WLM) of operation in a vehicle comprising an energy storage system having a rechargeable battery, the battery having at least one monitored battery power parameter, at least one parametric discharge power limit and a closed-loop controller operating through the execution of a plurality of control loops and adapted to determine whether the WLM is active or not active, the controller having a timer and a counter that are adapted to count time intervals associated with the implementation of the WLM by incrementing a count when the WLM is active and decrementing the count or maintaining a zero count when the WLM is not active; comprising the steps of:

(1) determining a WLM ratio using a vehicle speed input and a vehicle torque command input;

(2) initializing the timer, counter and a control loop, wherein the WLM ratio is set to zero for the first control loop;

(3) determining whether the WLM is active and whether the timer is expired, and if the WLM is active and the timer is not expired, proceeding to step (4), otherwise, proceeding to step (5);

(4) incrementing the timer and counter and proceeding to step (8);

(5) setting the WLM ratio to zero;

(6) decrementing the timer and counter and proceeding to step (7);

(7) setting a lower limit for the counter and proceeding to step (8);

(8) determining the amount of a WLM discharge power limit shift that is based on the WLM ratio;

(9) applying the WLM discharge power limit shift to at least one parametric discharge power limit; and

(10) determining whether the control loop is the last control loop, wherein if the control loop is the final control loop, and if yes, ending the algorithm, and if no, iterating the algorithm for another control loop by returning to step (1).

12. The method of claim 11, wherein calculating a WLM ratio using a vehicle speed input and a vehicle torque command input comprises the further steps of:

(1a) determining a WLM speed ratio ($R_N$) that characterizes the WLM as a function of the vehicle speed input;

(1b) determining a WLM torque ratio ($R_T$) that characterizes the WLM as a function of the vehicle torque command input;

(1c) multiplying $R_N$ and $R_T$ to obtain a WLM ratio ($R_{WLM}$); wherein the WLM ratio has a value which determines whether the WLM is active.

13. The method of claim 12, wherein $R_N$ comprises a value in the range $-1<R_N<1$, $R_T$ comprises a value in the range $-1<R_T<1$, and wherein WLM is active for values of $R_{WLM}$, where $0<R_{WLM}<1$, and WLM is not active for all other values of $R_{WLM}$.

14. The method of claim 13, wherein the value of $R_N$ as a function of the vehicle speed and the value of $R_T$ as a function of the torque command input are determined from a look-up table.

15. The method of claim 11, wherein the step of determining the amount of a WLM discharge power limit shift comprises imputing a change in at least one parametric battery discharge power limit as a function of at least one monitored battery power parameter.

16. The method of claim 15, comprising the further steps of:

(8a) shifting the monitored value of at least one of the monitored battery power parameters ($B_1$) to a lower value ($B_2$); and (8b) shifting the parametric battery power discharge limit ($P_1$) associated with $B_1$ to an increased value associated with a shifted parametric battery power discharge limit ($P_2$) in accordance with a parametric relationship between the at least one parameter and the parametric battery power discharge limit.

17. The method of claim 16, wherein the amount by which the at least one parametric discharge power limit is increased and the value of the WLM discharge power limit are directly proportional to the value of $R_{WLM}$.

18. The method of claim 17, wherein the plurality of battery power parameters are selected from the group consisting of a battery temperature, battery state of charge and battery amp-hour throughput.

* * * * *